US008457025B2

(12) United States Patent
    Oulai

(10) Patent No.: US 8,457,025 B2
(45) Date of Patent: Jun. 4, 2013

(54) METHOD AND NETWORK NODE FOR SELECTING A NETWORK PREFIX TO BE ADVERTISED IN A COMMUNICATION NETWORK

(75) Inventor: Desire Oulai, Longueuil (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 948 days.

(21) Appl. No.: 12/549,608

(22) Filed: Aug. 28, 2009

(65) Prior Publication Data

US 2011/0051659 A1    Mar. 3, 2011

(51) Int. Cl.
    *H04B 7/00*    (2006.01)
(52) U.S. Cl.
    USPC ............................................. 370/310
(58) Field of Classification Search
    USPC ............... 370/310, 328, 329, 331; 455/403, 455/422.1, 436, 442
    See application file for complete search history.

(56) References Cited

U.S. PATENT DOCUMENTS

| 2005/0271050 A1* | 12/2005 | Akgun et al. | 370/389 |
| 2007/0147320 A1* | 6/2007 | Sattari et al. | 370/338 |
| 2008/0219263 A1* | 9/2008 | Kumazawa et al. | 370/392 |
| 2009/0052416 A1* | 2/2009 | Kumazawa et al. | 370/338 |

FOREIGN PATENT DOCUMENTS

EP        2 015 535 A1    1/2009

OTHER PUBLICATIONS

T. Narten et al., Neighbor Discovery for IP version 6 (IPv6), Network Working Group, RFC 4861, Sep. 2007, pp. 1-97 (in printout 1-87).
S. Thomson et al., IPv6 Stateless Address Autoconfiguration, Network Working Group, RFC 4862, Sep. 2007, pp. 1-30 (in printout 1-27).
S. Gundavelli et al., Proxy Mobile IPv6, Network Working Group, RFC 5213, Aug. 2008, pp. 1-92.
Purposes of Neighbor Solicitation, Internet 2, Engineering Workshops, http://ipv6.internet2.edu/fiu/presentations/11-neighbor-solicitation.ppt, downloaded Aug. 24, 2009, workshop held Feb. 1-2, 2003 (http://ipv6.internet2.edu/fiu/), pp. 1-9.
Jeyatharan, C. Ng et al.: "Multiple Interfaced Mobile Nodes in Net LMM"; Oct. 29, 2008; 39 pages; XP015059248.
Premec, D. et al.: "Inter-technology Handover in PMIPv6 Domain"; Mar. 9, 2009; 18 pages; XP015061680.

* cited by examiner

*Primary Examiner* — Fan Ng
(74) *Attorney, Agent, or Firm* — Ericsson Canada Inc.; Alex Nicolaescu

(57) ABSTRACT

Method and nodes for selecting a network prefix to be advertised in an IP network comprising an access router and a mobile node (MN). From the access router, a first validity period is used to advertise at least a first and a second network prefixes towards the MN. The access router receives a message from the MN indicating an intended address thereof that it intends to use. In the access router, based on the message, only one of the first or second network prefix that the MN needs to use is then determined. The access router afterwards advertises towards the MN the only one network prefix with a second validity period longer than the first validity period. The access router may further acquire a current address and a current network prefix used by the MN and it may use these in the determination of the only one network prefix.

12 Claims, 4 Drawing Sheets

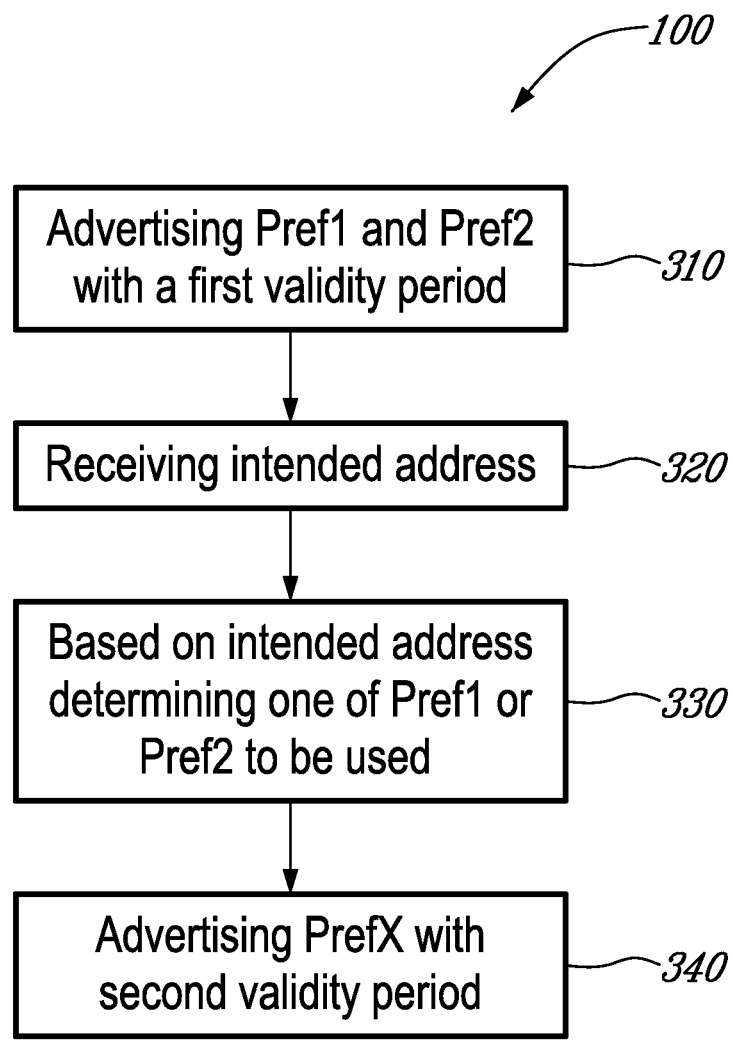

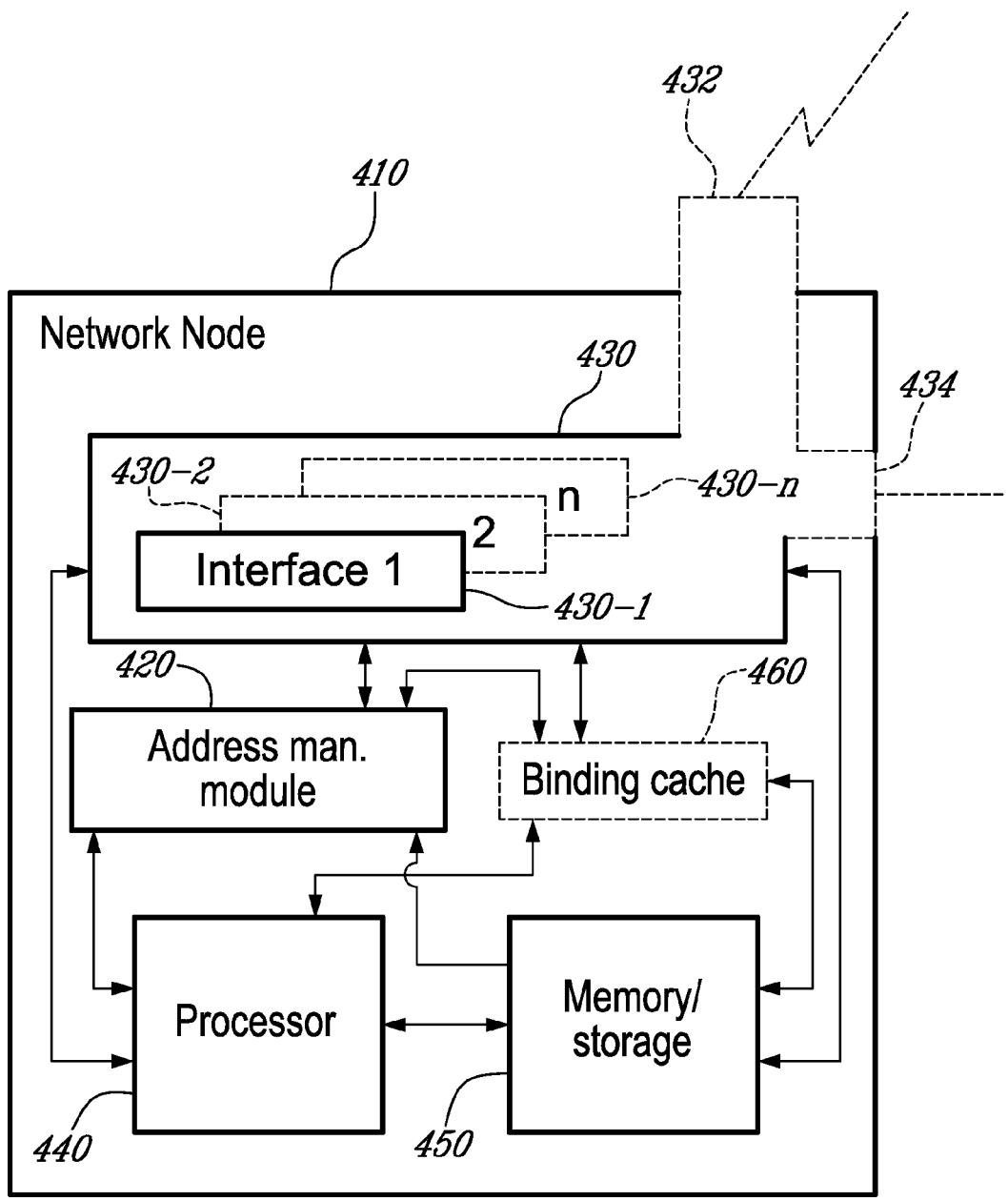

METHOD AND NETWORK NODE FOR SELECTING A NETWORK PREFIX TO BE ADVERTISED IN A COMMUNICATION NETWORK

TECHNICAL FIELD

The present invention relates to mobility management in an Internet Protocol network and, more particularly, to mobility management in a Mobile IPv6 network.

BACKGROUND

Over the past few decades, telecommunications and Internet have experienced an incredible growth and expansion. Technologies have changed from centralized computing to personalized computing and now to mobile computing with a convergence of networks, devices and services.

Mobile computing is made possible through the use of Mobile Internet Protocol (IP) or more specifically Mobile IPv6 (MIPv6), using the version 6 of IP. Mobile IPv6 (MIPv6) is an Internet Engineering Task Force (IETF) standard communication protocol. It has been designed to allow mobile users to move from one network to another without experiencing discontinuity of services. Indeed, MIPv6 protocol provides for continuous IP services to a mobile node (MN) by maintaining connectivity of the MN with the different networks. The mobile node is a mobile host such as, for example, a mobile phone, a laptop, a Personal Digital Assistant (PDA), etc.

The mobility services are deployed through a Home Agent (HA) which provides a Home Address (HoA) to a MN registered with that HA. When the MN moves away and attaches itself to a different access router, it acquires a new address, called the Care-Of Address (CoA). The MN then sends a Binding Update (BU) to the HA in order to bind the CoA to the HoA, so that traffic directed to the HoA is forwarded to the CoA. The HA replies back to the MN with a Binding Acknowledgement (BA) and forwards each data packet with HoA as destination address to the CoA using a bidirectional tunnel, for example. By so doing, the mobile node (MN) is able to move without ending ongoing sessions as the HoA of the MN remains unchanged.

However, there still exist mobile hosts that have not implemented MIPv6, for reasons such as they do not want to or they cannot. For those hosts, a proxy version, called PMIP, has been developed. When using IPv6, the proxy mobile IP is referred to as PMIPv6.

PMIP has been designed for local mobility handling. The MN is connected to an access router or Mobile Access Gateway (MAG) using a layer 2 access technology, for example. The MAG is responsible for managing the mobility at least partially on behalf of the MN. In a PMIP domain, a Local Mobility Anchor (LMA) is also defined for distributing the Home Network prefixes (or addresses) and hiding the mobility from the external world, i.e., outside of the PMIP domain. The binding is performed by the MAG using a Proxy BU (PBU) and the LMA responds back with a Proxy BA (PBA). When moving into the PMIP domain, the concept of CoA is replaced by a Proxy CoA (PCoA), which is the address of the MAG with which the MN is registered. Once the binding is completed, data packets are tunneled between the LMA and the MAG.

MIP offers global mobility and PMIP offers local mobility. More specifically, PMIP provides for network-based mobility management in the PMIP domain, i.e., the MAG manages the mobility at least partially on behalf of the MN. For this reason, it is common to see service operators using and deploying such PMIP domains.

It is now common to have mobile hosts with more than one network interface. In the contexts of MIP and PMIP, for instance, it is not always possible to ascertain which interface of a MN is to be used, especially when the MN is on the move from one access router to another.

SUMMARY

A first aspect of the present invention is directed to a method in an Internet Protocol (IP) network for selecting a network prefix to be advertised. The IP network comprises an access router and a mobile node in connection with the access router. The method comprises the steps of, from the access router, advertising with a first validity period at least a first network prefix and a second network prefix towards the mobile node and, in the access router, receiving a message from the mobile node indicating an intended address of the mobile node that the mobile node intends to use. In the access router, based on the message, only one of the first or second network prefix that the mobile node needs to use is then determined. The access router afterwards advertises towards the mobile node the only one network prefix with a second validity period longer than the first validity period.

Optionally, the method may further comprise, prior to advertising the first network prefix and second network prefix, establishing a layer-2 connection from the access router with the mobile node and sending, from the access router towards a network node, a handover indication message comprising an identifier of the mobile node. The access router would then afterwards receive from the network node the first network prefix used by the mobile node on a first interface thereof, a current address of the mobile node used on the first interface and the second network prefix. In this optional implementation, the step of determining may yet further comprise determining that if the current address received from the network node equals the intended address received from the mobile node, then the only one network prefix is the first network prefix. Otherwise, the only one network prefix is the second network prefix.

Another option in the method is that it further comprises a step of, prior to determining the only one network prefix, receiving a current address of the mobile node. When the intended address and the current address of the mobile node are different and the message received from the mobile node further indicates an intention of the mobile node to use the first network prefix, the method may then further comprise a step of sending, from the access router to the mobile node, a further message to prevent the intended address from being used.

Yet another option of the method is to comprise a step of sending a confirmation message to a network node for transferring addressing information of the mobile node thereto.

A second aspect of the present invention is directed to an access Router in an Internet Protocol (IP) network. The access router comprises a network interface and an address management module. The address management module is for advertising with a first validity period at least a first network prefix and a second network prefix towards a mobile node via the network interface. The address management module is also for receiving via the network interface a message from the mobile node indicating an intended address of the mobile node that the mobile node intends to use. The address management module then determines based on the message, only one of the first or second network prefix that the mobile node needs to use and advertises the only one network prefix with a second validity period longer than the first validity period towards the mobile node via the network interface.

An optional behavior of the address management module suggests that it is further for, prior to advertising the first network prefix and second network prefix establishing a layer-2 connection with the mobile node, sending a handover indication message comprising an identifier of the mobile node towards a network node via a second network interface and receiving, from the network node via the second network interface, the first network prefix used by the mobile node on a first interface thereof, a current address of the mobile node used on the first interface and the second network prefix. A further option is for the address management module to further determine that if the current address received from the network node equals the intended address received from the mobile node, then the only one network prefix is the first network prefix. Otherwise, the only one network prefix is the second network prefix.

Another optional behavior of the address management module is that it further receives a current address of the mobile node and the intended address and the current address of the mobile node are different. When the message received from the mobile node further indicates an intention of the mobile to use the first network prefix, then the address management module may further send a further message to prevent the intended address from being used from the access router to the mobile node via the network interface.

In another optional implementation, the address management module may be further for sending a confirmation message to a network node for transferring addressing information of the mobile node thereto.

A third aspect of the present invention is directed to a network node in an Internet Protocol (IP) network comprising a network interface, a binding cache for maintaining addressing information of mobile nodes under management by the network node and an address management module. The address management module is for receiving from an access router via the network interface a handover indication message comprising an identifier of a mobile node and retrieving from the binding cache addressing information of the mobile node comprising an address of the mobile node and a network prefix used by the mobile node. The address management module further determines a second network prefix to be advertised to the mobile node and sends, to the access router via the network interface, the network prefix used by the mobile node, the address of the mobile node used on the first interface and the second network prefix.

In some optional implementations, the address management module may be further for receiving a confirmation message via the network interface from the access router comprising new addressing information of the mobile node. The new addressing information of the mobile node may comprise a new address of the mobile node used under the access router and a new network prefix of the mobile node used under the access router. The network node thereafter updates the binding cache with the received addressing information.

BRIEF DESCRIPTION OF THE DRAWINGS

For a more detailed understanding of the invention, reference can now be made to the following description, taken in conjunction with the accompanying drawings, in which

FIG. 3 is an exemplary flow chart in accordance with the teachings of the present invention; and.

FIG. 4 is a network node logical representation in accordance with the teachings of the present invention.

DETAILED DESCRIPTION

Figure 1:
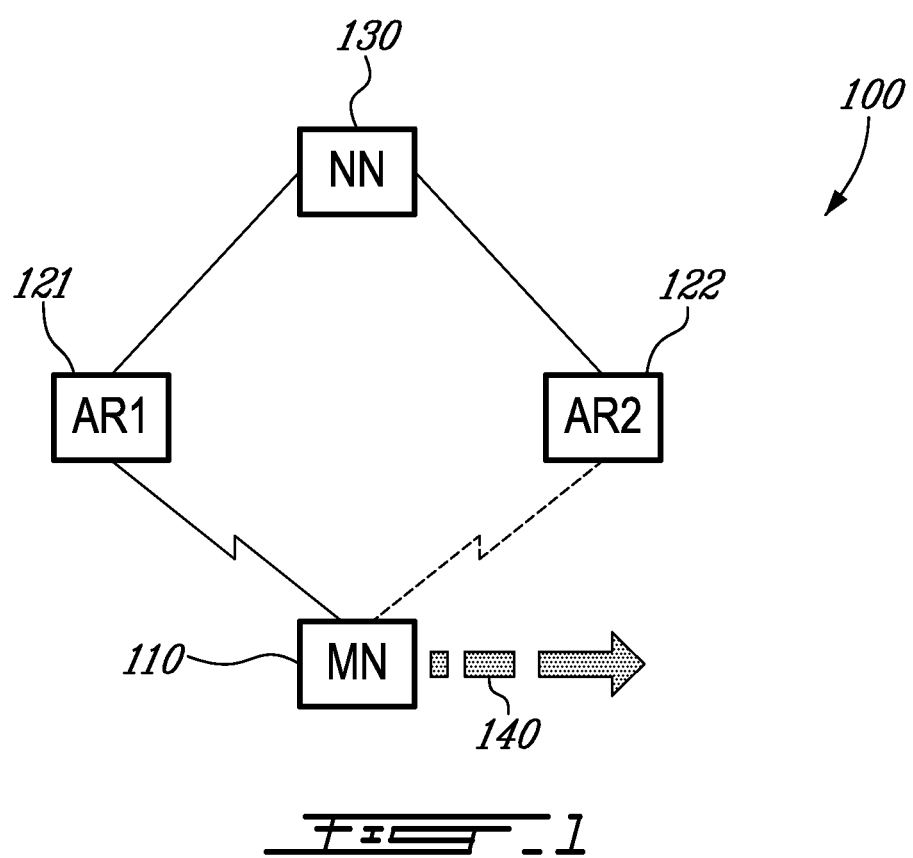
FIG. 1 is an exemplary Internet Protocol (IP) network 100 in accordance with the teachings of the present invention.

The invention aims at providing methods and nodes, compatible with multi-interface mobile nodes (in single or different technologies) but not limited thereto, for selecting a network prefix to be advertised by an access router. The invention is of particularly interest for inter-interface/inter-technology handover. It targets reduction of the handover delay and aims at improving the handover decision especially in situation where an expected handover indicator (HI) is missing or unknown. The general concept of the invention is to advertise, from an access router (such as a MAG) towards a mobile node (MN), more than one network prefixes with short validity period and, based on the action of the MN, to extend the validity period of only one of the advertised network prefix.

In theory, PMIP allows a MN to perform inter-interface handover. For this purpose, the MAG provides the LMA with information on the handover type through a handover indication (HI) option present in the PBU. If the HI value is 1 (Attachment over a new interface), the LMA assigns a new network prefix to new interface of the MN. If the value is 2 (Handoff between two different interfaces of the mobile node), the LMA assigns the same network prefix to what is said to be a new interface and deregisters the old interface. In cases where the handover type is unknown (HI value is 4), the LMA waits a certain time. If there is no deregistration from the old interface, the LMA assigns a new network prefix to what is said to be a new interface. If the old interface deregisters during the waiting time, the LMA assigns the same network prefix.

The occurrence of unknown handover type may be frequent as the principle of PMIP is that the MN is not involved in mobility. However, the decision on what interface shall be used lies solely on the MN, (e.g., whether it is a handover, addition of a new connection, etc.). Therefore, several problems are likely to arise by blindly applying the solution described above. It is unreasonable to assert that all access technologies will timely detect interface disconnection and deregistration for all purposes of mobile communications. Said differently, some access technologies require significant delay before detecting that an old interface is no more connected and initiating deregistration. This likely incurs increased handover delay, packet loss and wrong decision making at the LMA, which leads to loss of connectivity. Another identified limitation is that the expected solution described above does not allow make before break as the former connection needs to be torn down before switching to the new one.

In an exemplary embodiment, an access router (e.g., mobility access gateway) compatible with the teachings of the present invention advertises, with a first validity period, at least a first and a second network prefixes towards a mobile node. The access router thereafter receives a message from the mobile node indicating an address of the mobile node that the mobile node intends to use (e.g., via an address validation procedure such as the Duplicate Address Detection (DAD) procedure). The access router then determines, based on the message from the mobile node, only one of the first or second network prefix that the mobile node needs to use. The access router then advertises this only one network prefix towards the mobile node with a second validity period longer than the first validity period.

Prior to advertising the two or more network prefixes, the access router may have established a layer-2 connection with the mobile node. In such cases, the access router could send a handover indication message (e.g., a proxy binding update with a handover indication flag set to 4) comprising an identifier of the mobile node to a network node (e.g., a local mobility anchor). The access router could then receive from the network node the first network prefix as used by the mobile node on a first interface thereof, a current address of the mobile node used on the first interface and the second network prefix. If the access router determines that the current address received from the network node equals the intended address received from the mobile node, then the network prefix to be advertised for a longer validity period is determined to be the first network prefix. Otherwise, the network prefix to be advertised for a longer validity period is the second network prefix.

Prior to the determining which of the network prefixes is to be advertised for a longer validity period, the access router may have received a current address of the mobile node. The access router may then take into account further information received from the mobile node in the message. For instance, the message may indicate that the mobile node intends to use the first network prefix. In this exemplary case, the access router may send to the mobile node a further message to prevent the intended address from being used (e.g., a DAD failure message or a neighbor advertisement message comprising the DAD failure). This can be done to avoid a single network prefix from being used on different network interfaces.

Reference is now made to the drawings in which FIG. 1 shows an exemplary Internet Protocol (IP) network 100 in accordance with the teachings of the present invention. On FIG. 1, a mobile node (MN) 110 is shown connected to a first access router (AR1) 121 in turn connected to a network node (NN) 130. A second access router (AR2) 122 is shown connected to the NN 130. Taking the invention to the more specific context of PMIP, the access routers AR1 121 and AR2 122 would be Mobility Access Gateways (MAGs) and the NN 130 would be a Local Mobility Anchor (LMA).

One of the many exemplary applications of the invention is the MN 110 being mobile towards the AR2 122 (as shown by the arrow 140) and performing a handover from the AR1 121 to the AR2 122 (using one or multiple access technologies). A second exemplary application of the invention is for the MN 110 to remain under the AR1 121, but use a different access technology to establish a new connection thereto. A third exemplary application of the invention is for the MN 110 to be in a geographical zone covered by both the AR1 121 and the AR2 122. In this third example, the MN 110 could actually be static to a given location for a long period and still trigger the present invention. Of course, a person skilled in the art will readily recognize that the IP network 100 likely comprises more than the MN 110, the two access routers AR1 121 and AR2 122 and the NN 130. As such, the invention could be triggered concurrently in many portions of the network 100 and/or towards the MN 110 by further access router(s) (not shown).

Figure 2:
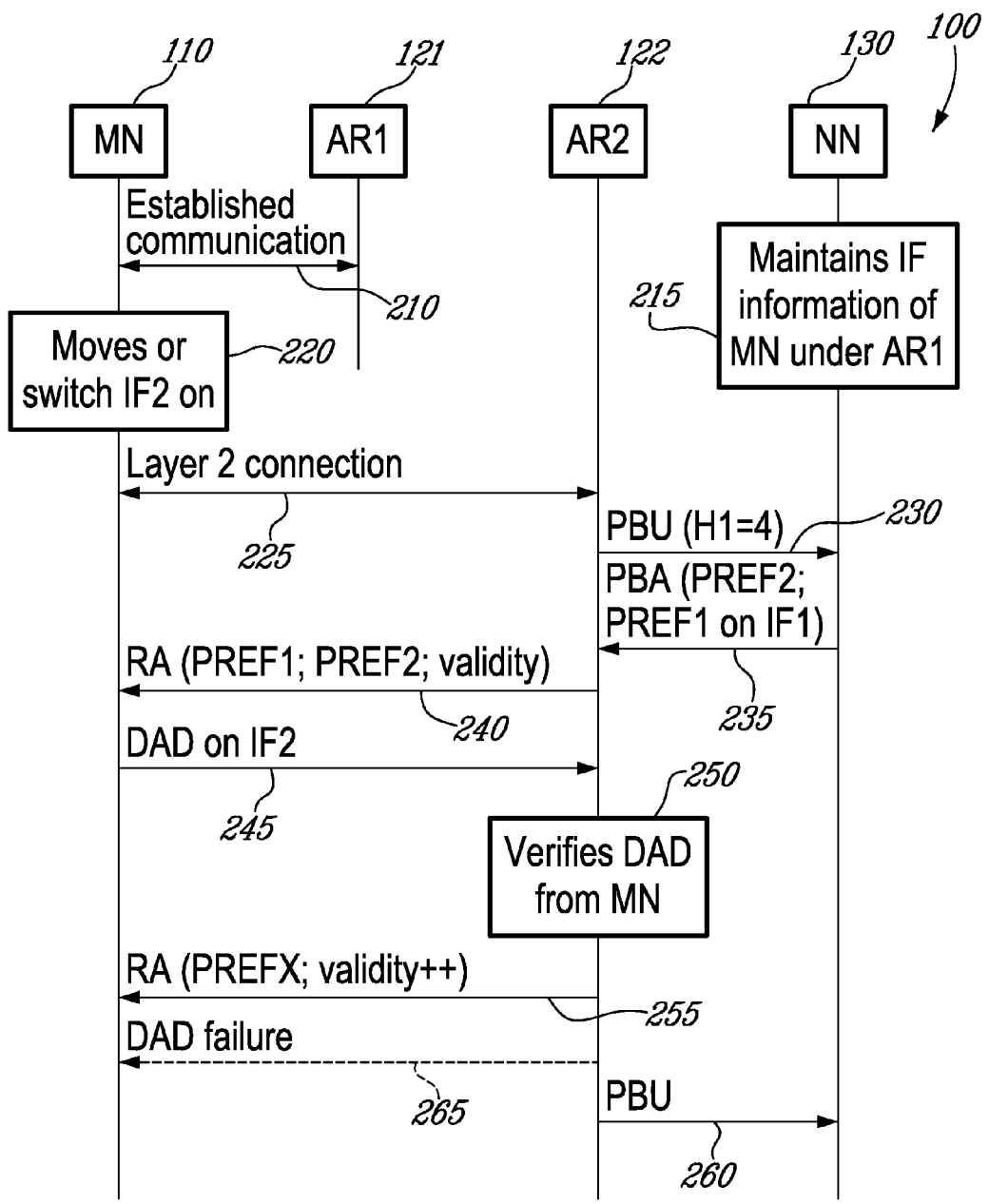
FIG. 2 is an exemplary nodal operation and signal flow chart in accordance with the teachings of the present invention

FIG. 2 shows an exemplary nodal operation and signal flow chart in accordance with the teachings of the present invention. The example shown on FIG. 2 relates more specifically to the handover situation described earlier from the AR1 121 to the AR2 122. Yet, persons skilled in the art will appreciate that the invention is capable of numerous adaptations to apply in various other contexts.

The MN 110 is shown as having an established connection with the AR1 121 via a first network interface of the MN 110 using a first address HoA1 (not shown on FIG. 1 or 2). It is expected that the NN 130 keeps track of addressing information of the MN 110 using the first interface under the AR1 121 as shown on FIG. 2 at 215. The addressing information maintained at the NN 130 may comprise, for instance, the network prefix (e.g., PREF1) used by the AR1 121, the HoA1 used by the MN 110 under the AR1 121, an identifier of the MN 110, a tunnel identifier of the tunnel between the AR1 121 and the NN 130, a network interface identifier related of the MN 110, an access technology type for the MN 110, a link layer identifier of the MN 110, etc. The MN 110 thereafter moves towards the AR2 122 (140) or is able to connect to the AR2 122 using a second interface thereof (not shown) as shown on FIG. 2 at 220. In either case, the example of FIG. 2 follows with the MN 110 establishing a layer 2 connection 225 (e.g., point-to-point connection) towards the AR2 122.

Upon establishment of the layer 2 connection 225 between the MN 110 and the AR2 122, the AR2 122 is able to send a handover indication 230 to the NN 130. The handover indication 230 informs the NN 130 that the AR2 122 is now connected to the MN 110. The handover indication 230 could further indicate that the AR2 122 was unable to determine if the MN 110 intends to handover between different access technologies. In the context of PMIP, the handover indication 230 is a proxy binding update (PBU) comprising a HI parameter. If the intention of the MN 110 could not be ascertained, the HI parameter shall have a value of 4 (as specified at the time of the invention).

The NN 130 is then capable of replying to the handover indication 230 towards the AR2 122 with an acknowledgment message 235. The acknowledgement message 235 is one of the different alternatives used to inform the AR2 122 of the network prefix (i.e., PREF1) and address (i.e., HoA1) currently used by the MN 110. The PREF1 and the HoA1 could be obtained from the AR1 121 (e.g., using pre existing tunnels specific signaling message, etc.), from the MN 110 (even if it is not seen as the most optimal solution at the time of invention), etc. In the context of inter-access technology at a single multi-technology access router (i.e., the AR1 121 and the AR2 122 would be the same node), there could be sharing of information between the access technologies without any message. In the context of PMIP, the acknowledgment message 235 is a Proxy Binding Acknowledgement (PBA) and is likely to further comprise a second network prefix (e.g., PREF2) provided by the NN 130 to the AR2 122. The PREF2 could also be determined by the AR2 122 or be obtained otherwise (e.g., through Dynamic Host Configuration Protocol (DHCP), from an Authentication, Authorization, and Accounting (AAA) server, etc.).

The AR2 122 then advertises 240 at least the PREF1 and the PREF2 to the MN 110 with relatively short period of validity (in comparison to usual period of validity). The advertisement 240 may comprise more than two network prefixes for various reasons, but shall contain at least PREF1 and another network prefix. The MN 110 then tries to verify that an address it intends to use with the AR2 122 is proper (as specified, e.g., by the RFC 4861 and RFC 4862, in a procedure known as duplicate Address Detection—DAD). A message 245 is therefore sent from the MN 110 that at least reaches the AR2 122. The message 245, in the context of DAD, is likely a Neighbor Solicitation message. The AR2 122 then verifies the message 245 to better assess the intention of the MN 110 (shown on FIG. 2 in 250). The AR2 122 therefor uses the intended address received in the message 245 together with PREF1 and the HoA1. If the MN 110 intends to do inter-technology handover, the intended address shall match the HoA1. However, if the MN 110 does not intend to do inter-technology handover, the intended address shall be a new address (e.g., HoA2) configured either from PREF1 or PREF2.

The AR2 122 will thereupon extend validity period of one of PREF1 or PREF2 as needed and will leave the short timeout invalidate the other prefix. This is shown on FIG. 2 by an advertisement 255 that specifies a network prefix PREFX selected from the network prefixes previously sent in advertisement 240 based on, e.g., the preceding logic.

More specifically, in the example of FIG. 2, if the intended address is HoA1, the AR2 122 will extend the validity period of PREF1 as the MN 110 intends to use this prefix on its second interface. The AR2 122 could then send a confirmation message (260) to the NN 140 for transferring addressing information of the MN 110 thereto (e.g., PREF1 and HoA1 being used under the AR2 122 on a second network interface of the MN 110).

If the intended address is HoA2 formed with PREF1, the AR2 122 could decide to prevent the MN 110 from using the HoA2 by, for example, sending a DAD failure message 265 (e.g., Neighbor Acknowledgement indicating that the HoA2 is already in use). This prevention makes sense in the context of PMIP as it is not allowed to have a single prefix associated with different network interfaces of the MN 110. The AR2 122 would then extend validity period of PREF2. As the MN 110 does not intend to do inter-interface handover, it is expected that the MN 110 will configure a further address using PREF2. If the intended address is HoA2 formed with PREF2, the AR2 122 shall extend the valid lifetime of PREF2. PREF1 will become invalid as the valid lifetime set was short. The AR2 can then send a confirmation message (260) to the NN 130 for transferring addressing information of the MN 110 thereto (e.g., PREF2 and HoA2 being used under the AR2 122 on the first or second network interface of the MN 110).

FIG. 3 shows an exemplary flow chart in accordance with the teachings of the present invention. In the IP network 100, an access router advertises with a first validity period at least a first network prefix and a second network prefix towards a mobile node (310). The access router thereafter receives a message from the mobile node indicating an intended address of the mobile node that the mobile node intends to use (320). The access router then determines, based on the message, only one of the first or second network prefix that the mobile node needs to use (330) (e.g., prefx). The access router then advertises, towards the mobile node, the only one network prefix—prefx—with a second validity period longer than the first validity period (340).

FIG. 4 shows a network node 410 in accordance with the teachings of the present invention comprising an address management module 420 capable of communicating through a network interface module 430. The network interface module 430 comprises at least one interface 430-1, but may comprise more interfaces (e.g., 430-2, . . . 430-*n*). The network interface module 430, through the network interface(s) 430-1 to 430-*n*, may provide wireless (shown by 432) and/or wired (shown by 434) network capabilities. The network node 410 may also comprise a binding cache 470 capable of communicating through the network interface module 430 and with the address management module 420. The network node 410 also comprises at least one processor 440 and a memory/storage unit 450, which are connected to the other modules of the network node 410 as to provide there respective functionalities. The specific manner of using the processor 440 and the memory/storage unit 450 varies, as one skilled in the art would readily understand, depending on various conditions do not affect and that are not affected by the present invention.

The network node 410 may be used as an access router. In such examples, the address management module 420 may be for advertising with a first validity period at least a first network prefix and a second network prefix towards a mobile node via the network interface module 430. The address management module 420 may further receive, via the network interface module 430, a message from the mobile node indicating an intended address of the mobile node that the mobile node intends to use. The address management module 420 may then determine, based on the message, only one of the first or second network prefix that the mobile node needs to use and advertise the only one network prefix with a second validity period longer than the first validity period towards the mobile node via the network interface module 430.

In some optional implementation, the network node 410 acting as an access router may, prior to advertising the first network prefix and second network prefix, further use the address management module 420 for: establishing a layer-2 connection with the mobile node and sending, towards a second network node via the network interface module 430, a handover indication message comprising an identifier of the mobile node. The address management module 420 may then further receive, from the second network node via the network interface module 430, the first network prefix used by the mobile node on a first interface thereof, a current address of the mobile node used on the first interface and the second network prefix.

The address management module may also be further used for determining that if the current address received from the network node equals the intended address received from the mobile node, then the only one network prefix is the first network prefix and that the only one network prefix is otherwise determined to be the second network prefix.

The address management module may also, prior to determining the only one network prefix, receive a current address of the mobile node. The message received from the mobile node may also further indicate that the mobile node intends to use the first prefix. Then, if the intended address and the current address of the mobile node are different, the address management module 420 may further be for, sending a further message to prevent the intended address from being used from the access router to the mobile node via the network interface module 430.

The address management module 420 may also further send a confirmation message to the second network node for transferring addressing information of the mobile node thereto.

The network node 410 may further act as a core node such as a local mobility anchor (LMA). The binding cache 460 would therein be used for maintaining addressing information of mobile nodes under management by the network node 410. The address management module 420 would then be for receiving, from an access router via the network interface module 430, a handover indication message comprising an identifier of a mobile node. The address management module 420 would then retrieve, from the binding cache 460, addressing information of the mobile node comprising an address of the mobile node and a network prefix used by the mobile node. The binding cache 460 could also maintain other addressing information parameters such as, for instance, an identifier of the mobile node, a tunnel identifier of the tunnel between the network node and the access router, a network interface identifier related of the mobile node, an access technology type for the mobile node, a link layer identifier of the mobile node, etc. The address management module 420 would then determine a second network prefix to be advertised to the mobile node and send, to the access router via the network interface module 430, the network prefix used by the mobile node, the address of the mobile node used on the first interface and the second network prefix.

Optionally, the address management module 420 of the network node could receive a confirmation message via the network interface module 430 from the access router comprising new addressing information of the mobile node comprising a new address of the mobile node used under the access router and a new network prefix of the mobile node used under the access router. The address management module 420 would then update the binding cache 460 with the received addressing information.

The various features of the present invention have been described with reference to the figures. These various aspects are described in connection with examples to facilitate an understanding of the present invention, but should not be construed as limited to these examples or this class of examples. Rather, the examples are provided so that the disclosure will be thorough and complete, and will fully convey the scope of the invention to those skilled in the art.

The various alternatives of the present invention have been described with reference to block diagrams and/or operational illustrations of methods, servers, and/or computer program products. It is to be understood that each block of the block diagrams and/or operational illustrations, and combinations of blocks in the block diagrams and/or operational illustrations, can be implemented by radio frequency, analog and/or digital hardware, and/or computer program instructions. Thus, the various aspects of the present invention may be embodied in many different forms, and all such forms are contemplated to be within the scope of the invention. Computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Furthermore, in some illustrations, some blocks may be optional and may or may not be executed; these may be illustrated with dashed lines.

What is claimed is:

1. A method in an Internet Protocol (IP) network for selecting a network prefix to be advertised, the IP network comprising an access router and a mobile node in connection with the access router, the method comprising the steps of:
    from the access router, advertising with a first validity period at least a first network prefix and a second network prefix towards the mobile node;
    in the access router, receiving a message from the mobile node indicating an intended address of the mobile node that the mobile node intends to use;
    in the access router, determining based on the intended address, only one of the first or second network prefix that the mobile node needs to use; and
    from the access router, advertising towards the mobile node the only one determined network prefix with a second validity period longer than the first validity period.

2. The method of claim 1 further comprising, prior to the step of advertising the first network prefix and second network prefix, the steps of:
    in the access router, establishing a layer-2 connection with the mobile node;
    sending, from the access router towards a network node, a handover indication message comprising an identifier of the mobile node; and
    in the access router, receiving from the network node the first network prefix used by the mobile node on a first interface thereof, a current address of the mobile node used on the first interface and the second network prefix.

3. The method of claim 2 wherein the step of determining further comprises determining that:
    if the current address received from the network node equals the intended address received from the mobile node, then the only one network prefix is the first network prefix; and
    else, the only one network prefix is the second network prefix.

4. The method of claim 1 further comprising a step of, prior to the step of determining, receiving a current address of the mobile node, wherein the intended address and the current address of the mobile node are different and wherein the message received from the mobile node further indicates an intention of the mobile node to use the first network prefix, the method further comprising a step of sending from the access router to the mobile node a further message to prevent the intended address from being used.

5. The method of claim 1 further comprising a step of sending a confirmation message to a network node for transferring addressing information of the mobile node thereto.

6. An Access Router in an Internet Protocol (IP) network, the access router comprising:
    a network interface; and
    an address management module for:
        advertising with a first validity period at least a first network prefix and a second network prefix towards a mobile node via the network interface;
        receiving via the network interface a message from the mobile node indicating an intended address of the mobile node that the mobile node intends to use;
        determining based on the intended address, only one of the first or second network prefix that the mobile node needs to use; and
        advertising the only one determined network prefix with a second validity period longer than the first validity period towards the mobile node via the network interface.

7. The access router of claim 6 wherein the address management module is further for, prior to advertising the first network prefix and second network prefix:
    establishing a layer-2 connection with the mobile node;
    sending, towards a network node via a second network interface, a handover indication message comprising an identifier of the mobile node; and
    receiving, from the network node via the second network interface, the first network prefix used by the mobile node on a first interface thereof, a current address of the mobile node used on the first interface and the second network prefix.

8. The access router of claim 7 wherein the address management module is further for determining that:

if the current address received from the network node equals the intended address received from the mobile node, then the only one network prefix is the first network prefix; and else, the only one network prefix is the second network prefix.

9. The access router of claim 6 wherein the address management module is further for receiving a current address of the mobile node, wherein the intended address and the current address of the mobile node are different and wherein the message received from the mobile node further indicates an intention of the mobile to use the first network prefix, the address management module being further for sending a further message to prevent the intended address from being used from the access router to the mobile node via the network interface.

10. The access router of claim 6 wherein the address management module is further for sending a confirmation message to a network node for transferring addressing information of the mobile node thereto.

11. A network node in an Internet Protocol (IP) network comprising:
   a network interface;
   a binding cache for maintaining addressing information of mobile nodes under management by the network node; and
   an address management module for:
      receiving, from an access router via the network interface, a handover indication message comprising an identifier of a mobile node;
      retrieving, from the binding cache, addressing information of the mobile node comprising an address of the mobile node and a first network prefix used by the mobile node;
      determining a second network prefix to be advertised to the mobile node; and
      sending, to the access router via the network interface, the first network prefix used by the mobile node, the address of the mobile node used on a first interface of the mobile node and the second network prefix.

12. The network node of claim 11 wherein the address management module is further for:
   receiving a confirmation message via the network interface from the access router, the confirmation message comprising new addressing information of the mobile node which includes a new address of the mobile node used under the access router and a new network prefix of the mobile node used under the access router; and
   updating the binding cache with the received addressing information.

\* \* \* \* \*